(12) United States Patent
Evans et al.

(10) Patent No.: US 11,113,632 B1
(45) Date of Patent: Sep. 7, 2021

(54) SYSTEM AND METHOD FOR PERFORMING OPERATIONS ON MULTI-DIMENSIONAL FUNCTIONS

(71) Applicant: THE GOVERNING COUNCIL OF THE UNIVERSITY OF TORONTO, Toronto (CA)

(72) Inventors: Trefor W. Evans, Toronto (CA); Prasanth B. Nair, Richmond Hill (CA)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 0 days.

(21) Appl. No.: 17/154,493

(22) Filed: Jan. 21, 2021

Related U.S. Application Data

(60) Provisional application No. 63/082,824, filed on Sep. 24, 2020.

(51) Int. Cl.
*G06N 20/00* (2019.01)
*G06N 3/00* (2006.01)

(52) U.S. Cl.
CPC ............. *G06N 20/00* (2019.01); *G06N 3/008* (2013.01)

(58) Field of Classification Search
None
See application file for complete search history.

(56) References Cited

PUBLICATIONS

H. Liu et al, "When Gaussian Process Meets Big Data: A Review of Scalable GPs", IEEE Trans. on Neural Networks and Learning Systems 31.11, Nov. 2020, pp. 4405-4423. (Year: 2020).*

Dinh, Laurent, et al., Nice: Non-linear independent components estimation, arXiv:1410.8516v6 [cs.LG] Apr. 10, 2015.
Gao, Christina, et al., "i-flow: High-dimensional Integration and Sampling with Normalizing Flows", arXiv:2001.05486v2 [physics.comp-ph] Aug. 17, 2020.
Kandasamy, et al., "High Dimensional Bayesian Optimisation and Bandits via Additive Models", arXiv:1503.01673v3 [stat.ML], May 13, 2016.
Kingma, et al., "Glow: Generative Flow with Invertible 1x1 Convolutions", arXiv:1807.03039v2 [stat.ML], Jul. 10, 2018.
Kingma, et al., "Semi-supervised Learning with Deep Generative Models", arXiv:1406.5298v2 [cs.LG], Oct. 31, 2014.
Moreno-Muñoz, et al., "Heterogeneous Multi-output Gaussian Process Prediction", arXiv:1805.07633v2 [stat.ML] Jan. 2, 2019.
Nalisnick, et al., "Hybrid Models with Deep and Invertible Features", arXiv:1902.02767v2 [cs.LG], May 29, 2019.

(Continued)

*Primary Examiner* — Vincent Gonzales
(74) *Attorney, Agent, or Firm* — Bhole IP Law; Anil Bhole; Marc Lampert

(57) ABSTRACT

A system and method for performing operations on multi-dimensional functions using a machine learning model, the method including: receiving a problem formulation in input space; mapping the problem formulation from input space to one or more latent vectors or a set in latent feature space using a projection learned using the machine learning model; splitting the one or more latent vectors or set in latent space into a plurality of lower-dimensional groupings of latent features; performing one or more operations in latent space on each lower-dimensional groupings of latent features; combining each of the low-dimensional groupings; and outputting the combination for generating the prediction.

20 Claims, 6 Drawing Sheets

(56) References Cited

PUBLICATIONS

Papamakarios, et al., "Normalizing Flows for Probabilistic Modeling and Inference", arXiv:1912.02762v1 [stat.ML], Dec. 5, 2019.
C. E. Rasmussen & C. K. I. Williams, "Gaussian Processes for Machine Learning," the MIT Press, 2006, ISBN 026218253X. 2006 Massachusetts Institute of Technology. www.GaussianProcess.org/gpml.
Nickson, T., T. Gunter, C. Lloyd, M. A. Osborne, and S. Roberts (2015). "Blitzkriging: Kroneckerstructured Stochastic Gaussian Processes". In: arXiv preprint arXiv:1510.07965.

* cited by examiner

SYSTEM AND METHOD FOR PERFORMING OPERATIONS ON MULTI-DIMENSIONAL FUNCTIONS

TECHNICAL FIELD

The following relates generally to deep learning networks and more specifically to a system and method for performing operations on multi-dimensional functions.

BACKGROUND

Decision making without complete knowledge occurs in every industry and aspect of life. This is because the prediction of most real-world outcomes come with some level of uncertainty. The level of risk associated with a decision should typically be considered, particularly for important, valuable, or impactful decisions. However, it is often challenging to assess and predict risk where there are multiple variables affecting the outcome of a decision.

SUMMARY

In an aspect, there is provided a computer-implemented method for performing operations on multi-dimensional functions using a machine learning model, the method comprising: receiving a problem formulation in input space; mapping the problem formulation from input space to one or more latent vectors or a set in latent feature space using a projection learned using the machine learning model; splitting the one or more latent vectors or set in latent space into a plurality of lower-dimensional groupings of latent features; performing one or more operations in latent space on each lower-dimensional groupings of latent features; combining each of the low-dimensional groupings; and outputting the combination for generating the prediction.

In a particular case of the method, combining each of the low-dimensional groupings comprises applying a learned affine transformation.

In another case of the method, the problem formulation comprises a set in input space specifying a domain of integration, and wherein the one or more operations comprise evaluating lower-dimensional integrals comprising the lower-dimensional groupings.

In yet another case of the method, the problem formulation comprises an input query point, and wherein the one or more operations comprise evaluating lower-dimensional functions with the input query point.

In yet another case of the method, the lower-dimensional groupings comprise one-dimensional groupings.

In yet another case of the method, the learned projection comprises a hierarchy of components, at least a portion of the hierarchy of components are invertible.

In yet another case of the method, at least a portion of the hierarchy of components comprise invertible linear functions or invertible non-linear dimension-wise functions.

In yet another case of the method, wherein the machine learning model comprises a Bayesian or frequentist deep neural network or linear regression model.

In yet another case of the method, performing the one or more operations in latent space comprise performing operations on Gaussian processes.

In yet another case of the method, the Gaussian processes comprise additive Gaussian processes.

In yet another case of the method, parameters for the Gaussian processes are determined by optimization of an objective, the objective comprising one of maximum likelihood estimation, data log likelihood, log of the product of data likelihood, and evidence lower bound.

In another aspect, there is provided a system for performing operations on multi-dimensional functions using a machine learning model, the system comprising one or more processors in communication with a data storage, the one or more processors configured to execute: an input module to receive a problem formulation in input space; a conversion module to map the problem formulation from input space to one or more latent vectors or a set in latent feature space using a projection learned using the machine learning model, and to split the one or more latent vectors or set in latent space into a plurality of lower-dimensional groupings of latent features; an operations module to perform one or more operations in latent space on each lower-dimensional groupings of latent features; and an output module to combine each of the low-dimensional groupings and to output the combination for generating the prediction.

In a particular case of the system, combining each of the low-dimensional groupings comprises applying a learned affine transformation.

In another case of the system, the problem formulation comprises a set in input space specifying a domain of integration, and wherein the one or more operations comprise evaluating lower-dimensional integrals comprising the lower-dimensional groupings.

In yet another case of the system, the problem formulation comprises an input query point, and wherein the one or more operations comprise evaluating lower-dimensional functions with the input query point.

In yet another case of the system, the learned projection comprises a hierarchy of components, at least a portion of the hierarchy of components are invertible.

In yet another case of the system, the machine learning model comprises a Bayesian or frequentist deep neural network or linear regression model.

In yet another case of the system, performing the one or more operations in latent space comprise performing operations on Gaussian processes.

In yet another case of the system, the Gaussian processes comprise additive Gaussian processes.

In yet another case of the system, parameters for the Gaussian processes are determined by optimization of an objective, the objective comprising one of maximum likelihood estimation, data log likelihood, log of the product of data likelihood, and evidence lower bound.

These and other aspects are contemplated and described herein. It will be appreciated that the foregoing summary sets out representative aspects of embodiments to assist skilled readers in understanding the following detailed description.

DESCRIPTION OF THE DRAWINGS

A greater understanding of the embodiments will be had with reference to the Figures, in which.

DETAILED DESCRIPTION

Figure 1:
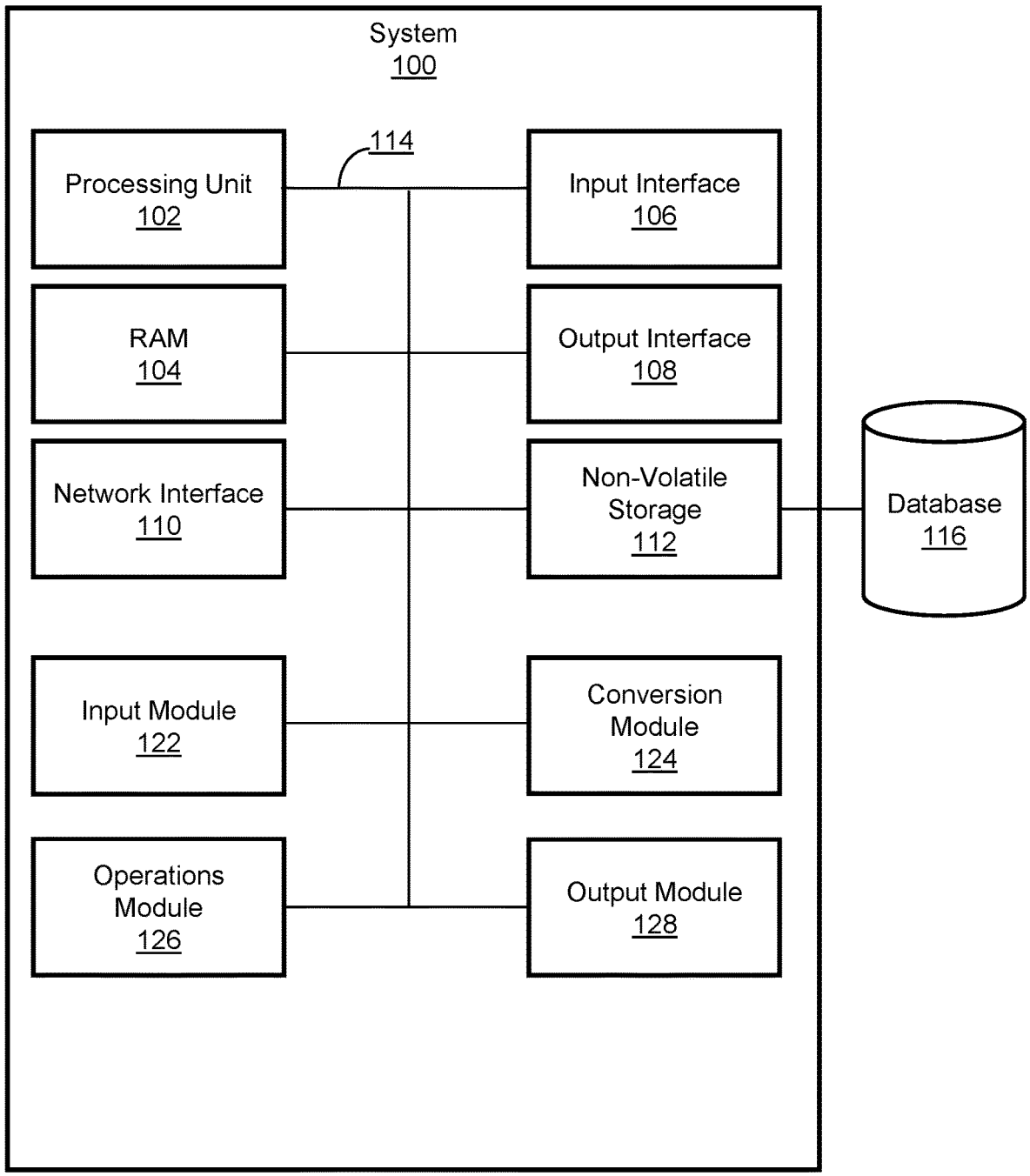
FIG. 1 is a schematic diagram of a system for performing operations on multi-dimensional functions, in accordance with an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Embodiments of the present disclosure provide a system and method that allow quantification and comprehension of risk to objectively inform decisions. This can be applied to various applications and sectors where advantages can include, for example:
- providing a means to quantify risk, enabling alternative options to be rigorously traded;
- identifying robust optimal decisions;
- providing error bars for predictions made by computational or machine learning models;
- discovering relationships between decision variables and system performance metrics;
- providing a means to certify a model for deployment so it can be used in high-stakes situations (for example, where failure could cause harm to individuals);
- providing analytical answers for whether there is enough information to make a decision and what needs to be done to become more informed;
- and the like.

The present embodiments can be applied to a broad range of learning problems and decision analysis applications where it can deliver accurate prediction statistics, and thus providing robust, quantifiable, and interpretable analytics to a practitioner. Embodiments of the present disclosure advantageously uses a deep Bayesian learning architecture and Bayesian analytics for high dimensional problems.

As would be appreciated by a person of skill, within the field of computation of analytics for decision making under uncertainty, it is fundamental to perform operations including (i) function evaluation; (ii) evaluation of high-dimensional integrals; and (iii) optimization of a function within a high-dimensional space. The foregoing examples may require any or a combination of these operations. The present embodiments describe a system that can provide these operations at relatively low computational cost.

Figure 2:
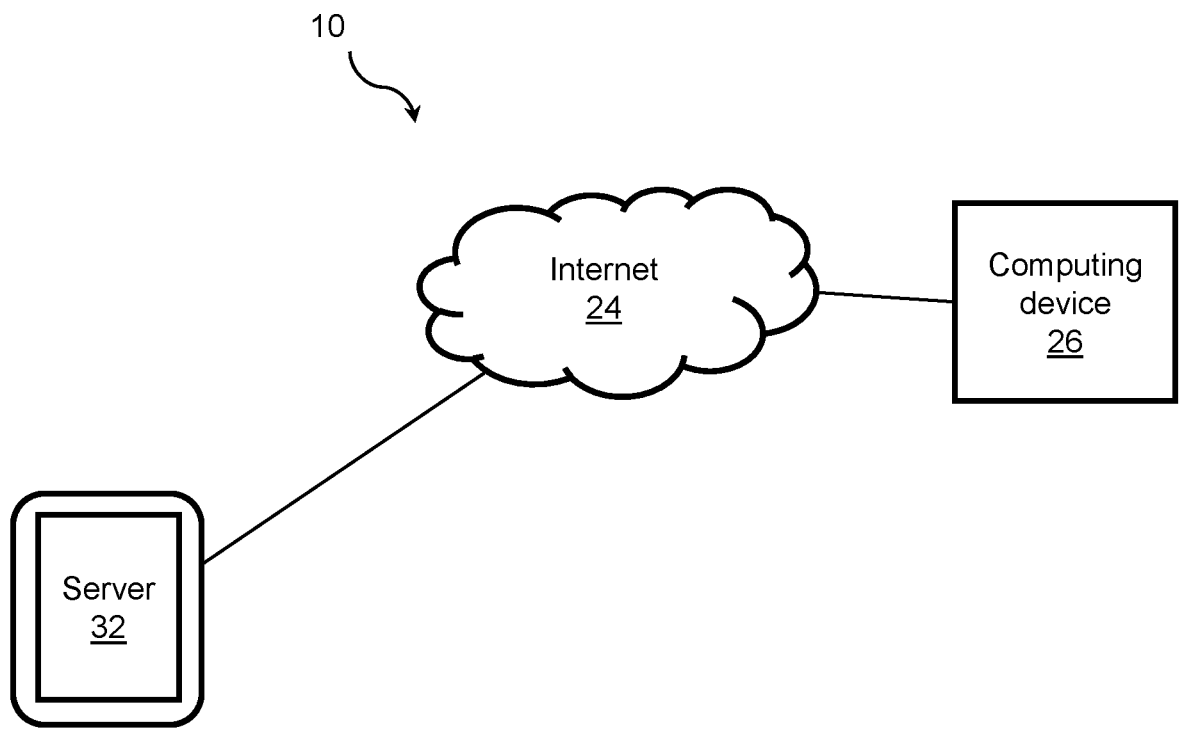
FIG. 2 is a schematic diagram showing the system of FIG. 1 and an exemplary operating environment.

Referring now to FIG. 1 and FIG. 2, a system 100 for performing operations on multi-dimensional functions, in accordance with an embodiment, is shown. In this embodiment, the system 100 is run on a computing device 26 and accesses content located on a server 32 over a network 24, such as the internet. In further embodiments, the system 100 can be run only on the device 26 or only on the server 32, or run and/or distributed on any other computing device; for example, a desktop computer, a laptop computer, a smartphone, a tablet computer, a server, a smartwatch, distributed or cloud computing device(s), or the like. In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a processing unit 102 (comprising one or more processors), random access memory ("RAM") 104, an input interface 106, an output interface 108, a network interface 110, non-volatile storage 112, and a local bus 114 enabling processing unit 102 to communicate with the other components. The processing unit 102 can execute or direct execution of various modules, as described below in greater detail. RAM 104 provides relatively responsive volatile storage to the processing unit 102. The input interface 106 enables an administrator or user to provide input via an input device, for example a keyboard and mouse. The output interface 108 outputs information to output devices, for example, a display and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, an operating system, the modules, and the related data may be retrieved from the non-volatile storage 112 and placed in RAM 104 to facilitate execution.

The system 100 includes one or more conceptual modules configured to be executed by the processing unit 102. In an embodiment, the modules include an input module 122, a conversion module 124, an operations module 126, and an output module 128. In some cases, some of the modules can be run at least partially on dedicated or separate hardware, while in other cases, at least some of the functions of some of the modules are executed on the processing unit 102.

The system 100 uses a machine learning framework to provide accurate prediction statistics. For learning problems, such predictions can be applied to supervised, semi-supervised, unsupervised, and reinforcement learning applications. Particularly advantageously, such predictions can be used for high-dimensional problems; a circumstance that arises frequently in real-world applications but is very challenging to deal with in a principled statistical manner using other tools and approaches. The machine learning framework is generally agnostic to dataset size; Gaussian processes are well suited to small-data problems but scaling Gaussian processes to large datasets is extremely difficult with other approaches. The system 100 can enable Gaussian processes with a flexible class of kernels to be scaled to big-data applications while maintaining an extremely high model capacity. In this way, it can provide highly accurate decision analytics to both small-data and big-data problems. Advantageously, the system 100 provides a substantial improvement that can eliminate barriers for the application of decision making under uncertainty to a wider range of sectors and applications.

Figure 3:
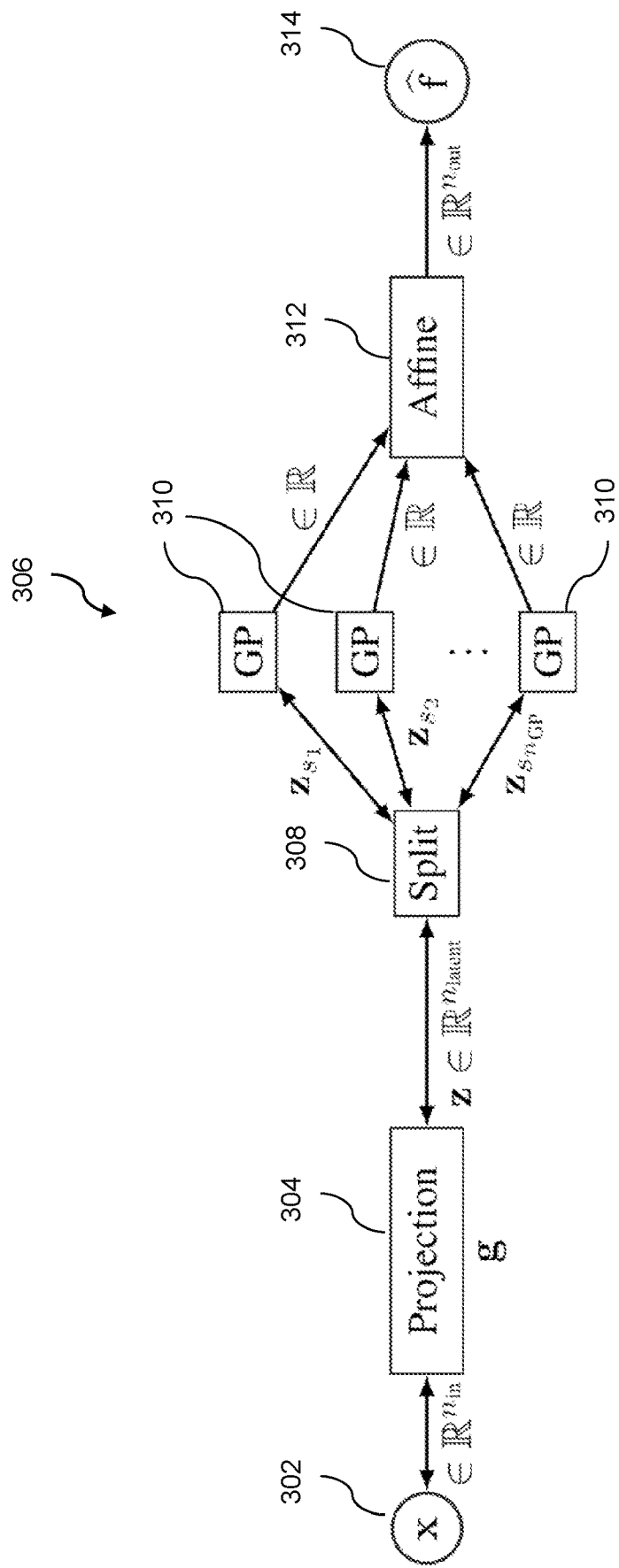
FIG. 3 is an example schematic architecture of a deep Bayesian learning component, in accordance with the system of FIG. 1.

FIG. 3 illustrates an example schematic architecture 306 of a deep Bayesian learning component. Block 302 represents an input space $x \in R^{n_{in}}$. The projection 304 g: $R^{n_{in}} \to R^{n_{latent}}$ maps the input space x 302 to latent space $z \in R^{n_{latent}}$, as performed by the conversion module 124.

The conversion module 124 can perform the projection 304 as $z=g(x)$, where multi-dimensional vectors or sets in input space $x \in R^{n_{in}}$ are passed through an invertible (or approximately invertible) function, flow, and/or map to a latent feature space $z \in R^{n_{latent}}$; in some cases, the latent feature space is lower dimensional. The projection g generally can be a deep architecture; meaning that it is composed of a hierarchy of components that are possibly invertible (or approximately invertible). In the case when g is invertible, then the inverse function $x=g^{-1}(z)$ is well defined and, in many cases, can be determined in closed form. This invertible feature can be used advantageously, as described herein.

When exact invertibility is not required, the components of the projection g could potentially have any functional form, for example linear or generalized linear functions, or dimension-wise non-linear functions (for example, activation functions). In an example, these layers could compose a deep neural network. To achieve approximate invertibility, or reconstruction with minimal information loss, techniques such as linear or nonlinear maps (with or without orthogonality constraints) may be used to model g (and subsequently $g^{-1}$).

If exact invertibility is required, then g should be considered with particular attention. Examples of choices for bijective components of g include invertible linear functions, or invertible non-linear dimension-wise (activation) functions. Additionally, a variety of other elements that are used to compose invertible neural networks and normalizing flows can be used.

Figure 4:
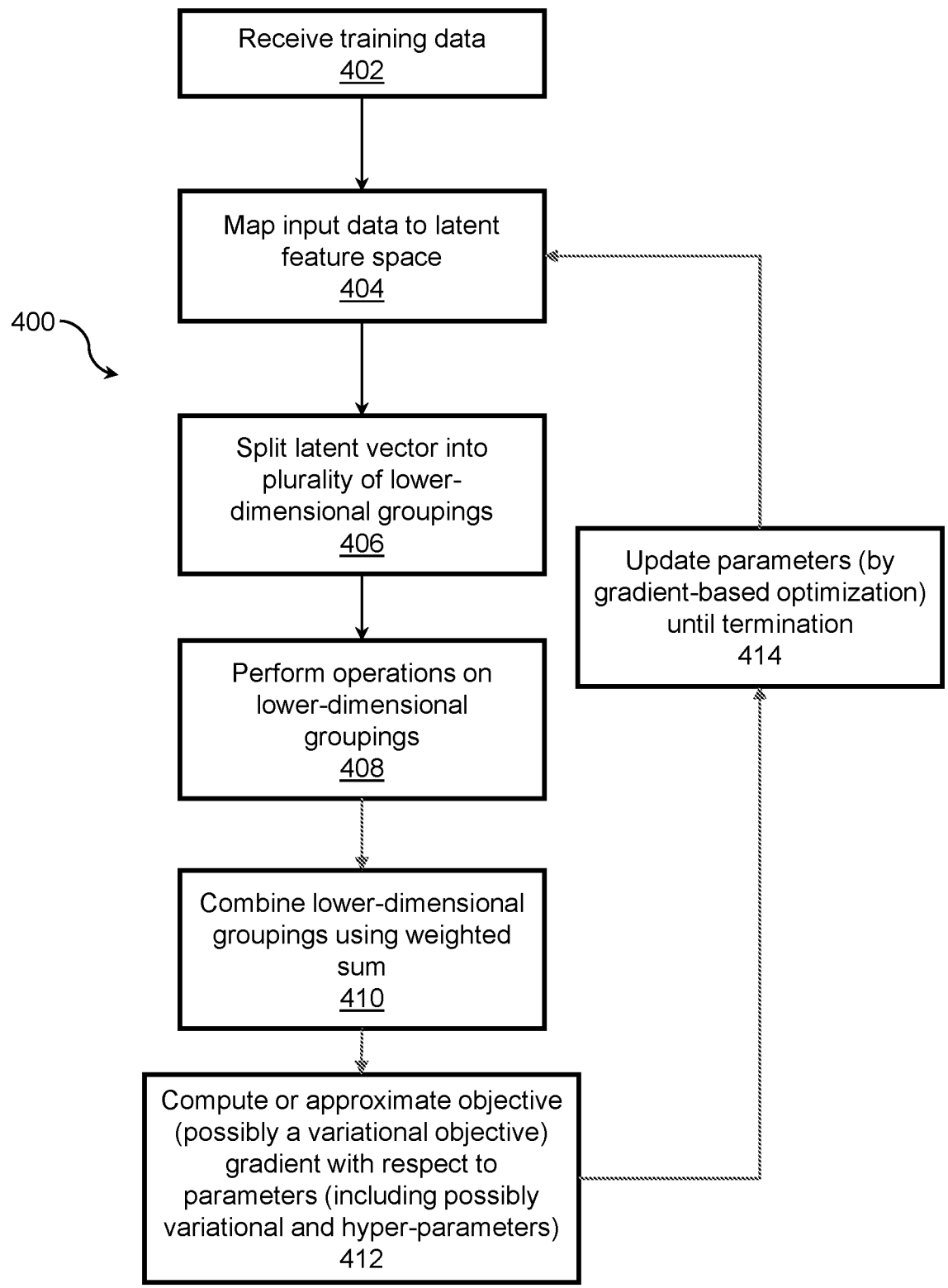
FIG. 4 is a flow chart of a method of training for performing operations on multi-dimensional functions, in accordance with an embodiment.

FIG. 4 illustrates training 400 of the architecture 306. For supervised learning problems, the system 100 uses an efficient Bayesian inference approach. It is assumed that there is access to the dataset $\{x^{(i)}, y(i)\}^{n_{data}}_{i=1}$ with training inputs $x^{(i)} \in R^{n_{in}}$ and training responses/targets $y^{(i)} \in R^{n_{out}}$. More generally, the system 100 can consider the responses $y^{(i)}$ to be of a general (and in some cases, mixed or heterogeneous) data type such as categorical, ordinal, positive, and the like. The dataset is input at block 402. As described above, at block 404, the input $x^{(i)}$ is mapped to latent space by the conversion module 124 through the learnable projection 304 as $z^{(i)}=g(x^{(i)}) \in R^{n_{latent}}$. Then, at block 406, $z^{(i)}$ is passed by the conversion module 124 through the split operator 308, which divides the vector $z^{(i)}$ into lower-dimensional groups as $\{z^{(i)}_{s_j}\}^{n_{GP}}_{j=1}=\text{split}(z^{(i)})$, where $s_j \subset \{1, 2, \ldots, n_{latent}\}$ contains a subset of indices in the latent dimension $n_{latent}$, and $z^{(i)}_{s_j} \in R^{|j|}$ are denoted as a vector with elements $\{z_l^{(i)}\}_{l \in s_j}$. In most cases, the $s_j$ that defines the split operations can be set a priori; however, a continuously relaxed permutation of the latent dimensions can be learned within the projection g. In most cases, the split operator 308 gives $z^{(i)}_{s_j}$ that are low-dimensional with $|s_j|$ small for all $j=1, \ldots, n_{GP}$.

At block 408, the (possibly approximate) posterior output of each $n_{GP}$ GP at block 310 can be computed simultaneously, each corresponding to low-dimensional groups $z^{(i)}_{s_j}$ of the latent features $z^{(i)}$. At block 410, a weighted sum of the outputs of these independent models is performed. This approach can be described formally as $$\hat{f}_x(g^{-1}(z^{(i)})) = \hat{f}_z(z^{(i)}) = A[\hat{f}_{z,1}(z^{(i)}_{s_1}),$$
$$\hat{f}_{z,2}(z^{(i)}_{s_2}), \ldots, \hat{f}_{z,n_{GP}}(z^{(i)}_{s_{n_{GP}}})]^T,$$

where $\hat{f}_x: R^{n_{in}} \to R^{n_{out}}$ and $\hat{f}_z: R^{n_{latent}} \to R^{n_{out}}$ are defined as the output 314 in terms of the input space $x=g^{-1}(z)$ and latent space $z=g(x)$, respectively. Additionally, $\hat{f}_{z,i}: R^{|s_i|} \to R$ is the output of the ith Gaussian process (GP) 310, and the matrix $A \in R^{n_{out} \times n_{GP}}$ are learnable components of the affine transformation 312. Observe that the structure in the preceding equation defines an additive GP. In this particular case, each of the additive components are defined over a low-dimensional grouping of latent variables. This architecture is justified in most cases as a vast majority of real-world problems can be additively or multiplicatively decomposed into a sum of functions defined over low-dimensional manifolds and therefore this architecture imposes negligible restrictions on the structure of the underlying problem. Additionally, note that the hierarchical architecture allows embedding of powerful prior information to further improve predictive capabilities. Such prior information could include incorporating existing predictive models, and including physics-informed constraints.

While the present disclosure generally focuses on Gaussian processes (GPs) at blocks 310, each GP (operating on a low-dimensional grouping of variables in latent space) could be replaced with any other choice of predictive Bayesian or frequentist model that takes a low-dimensional grouping of latent variables $z_{s_i} \in R^{|s_i|}$ and outputs a scalar prediction as $\hat{f}_{z,i}: R^{|s_i|} \to R$ for $i=1, \ldots, n_{GP}$. Such a modification would simply require changing the parameters (including possibly variational parameters or hyperparameters) for each $\hat{f}_{z,i}$ for $i=1, \ldots, n_{GP}$ during the training process described herein. In an example, $\hat{f}_{z,i}$ could consist of a Bayesian or frequentist deep neural network or linear regression model.

Bayesian inference for supervised learning performed by the system 100 can include determining the Gaussian process posterior for each $n_{GP}$ Gaussian process in addition to the posterior distributions over the free parameters of the projection g, as well as the elements of the matrix A. In addition to the elements described herein, Bayesian inference uses specification of Gaussian process priors for each of the $n_{GP}$ independent Gaussian processes, in addition to a prior distribution over the free parameters of the projection g, as well as the elements of the matrix A. It also uses specification of a likelihood that provides a probability that the supervised learning dataset was generated given specific model parameters. Note that the likelihood is a function of $\hat{f}$, at block 314, which is described herein. Using this prior and likelihood, the posterior distribution can be determined using variational inference. In further cases, point estimates of the parameters can be obtained through maximum likelihood estimation, or maximum a posteriori estimation. In these cases, the objective in 412 refers to the data log likelihood, or the log of the product of data likelihood and prior, respectively. In variational inference, a form of the posterior defined by a set of free variational parameters is assumed, which is estimated by minimizing the Kullback-Leibler divergence from this assumed variational posterior to the exact posterior. Minimizing the Kullback-Leibler divergence can be equivalent to maximization of the evidence lower bound (ELBO) and therefore the objective in 412 refers to the ELBO in the case of variational inference. Assuming that the likelihood is independent between the $n_{data}$ observations, the ELBO can be determined as a sum over the $n_{data}$ training observations; enabling the use of mini-batch sampling to be used for stochastic gradient computation, and large datasets to be considered. In the mini-batch sampling case, only a subset of the training dataset would be used in 404 at each iteration. Additional stochasticity may also be used to estimate expectations present in the ELBO (in situations where the terms cannot be computed in closed-form) through the use of a reparameterization approach, REINFORCE, or both. These computational strategies enable the use of gradient-based optimization techniques (such as stochastic gradient ascent) to be employed to maximize the ELBO with respect to parameters (such as variational parameters), and thus perform variational inference.

In some cases, additional hyperparameters may also be used in the model; for example, free hyperparameters of the GP prior in 310. In such cases, these hyperparameters can also be estimated by maximization of the ELBO. Alternatively, the parameters of the projection g or the elements of the matrix A can be chosen to be hyperparameters; in which case they could also be estimated by maximization of the ELBO rather than being present in the variational distribution.

Parameters (including possibly hyperparameters and variational parameters) within the Gaussian process posterior for each $n_{GP}$ Gaussian process, in addition to the projection g and the elements of the matrix A, can be estimated by optimization of any objective discussed herein. The objective value and/or gradient (with respect to the parameters) is computed or approximated (for example, stochastically) in 412. Parameter updates during the iterative objective optimization procedure are performed in 414. Such updates could take the form of stochastic gradient ascent, for example. Parameter updates would proceed until predetermined termination criteria are met. In an example, termination could occur when a maximum iteration count is exceeded.

The inference approach performed by the system 100 easily scales to large-data problems and also performs well in a small-data regime as a result of the architecture. For example, the projection enables discovery of low-dimensional manifolds, and reconstruction of the exact function requires exponentially less data in this reduced dimension. Also, exploiting correlations between outputs significantly increases the effectiveness of data available which is particularly beneficial in sparse data scenarios.

In an embodiment, the architecture in FIG. 3 can be modified for unsupervised learning when the projection 304 is a normalizing flow. In this embodiment, the projection 304 would be used to map the inputs space 302 to latent space without requiring use of at least some of the other elements of the architecture shown in FIG. 3.

To perform inference for an unsupervised learning problem, at block 402, the training dataset may include only training inputs, i.e., $\{x^{(i)}\}^{n_{data}}_{i=1}$. At block 404, the input $x^{(i)}$ is mapped to latent space by the learnable projection 304 as $z^{(i)}=g(x^{(i)}) \in \mathbb{R}^{n_{latent}}$. In the case where g is invertible and an assumed distribution over the latent space, Pr(z), is explicit (for example, an isotropic Gaussian distribution), the likelihood of the dataset can be determined in closed form. Note that the computations at blocks 406, 408, and 410 are not required in the case of unsupervised learning. The likelihood can be determined using the projection to be a change of variables for the probability density function over latent space. Evaluation of the closed-form dataset likelihood may require inversion and determination of a Jacobian determinant of the projection g; which can generally be performed efficiently for many normalizing flow and invertible neural network architectures. Inference by maximum likelihood estimation can involve estimation of the free parameters of the projection g to maximize the dataset log-likelihood which would be the objective in 412 (in the case of maximum likelihood estimation). Assuming that the inputs in the dataset are independent, the log-likelihood can be written as a sum over the $n_{data}$ training observations, enabling the use of mini-batch sampling approaches to be used to perform stochastic gradient ascent to estimate the parameters of the projection g. This mini-batch training approach allows the unsupervised training procedure to be performed on large datasets efficiently. In the mini-batch sampling case, only a subset of the training dataset would be used in 404 at each iteration. While maximum likelihood estimation of the parameters of the projection g are described, Bayesian inference could alternatively be performed by specifying a prior over the parameters of the projection g, and using variational inference to compute the posterior of the parameters. This variational inference procedure follows the procedures outlined herein for supervised learning; however, in the case of unsupervised learning, a different likelihood can be used. Additionally, parameters (including possibly hyperparameters and variational parameters) of the projection g are updated in 414 in the same manner outlined previously for supervised learning.

In an embodiment, the architecture in FIG. 3 can be modified for semi-supervised learning. Semi-supervised approaches capture the joint density of the training inputs x and responses y to enable many powerful problem formulations that can be exploited by the present embodiments; for example, making more efficient use of high-dimensional data in the small-data regime, anomaly or novelty detection, dealing with cases where many training observations are unlabelled, as well as formulations of optimization problems that encourage proposals that are similar to training samples. In the case where the projection g is non-invertible, a semi-supervised variational autoencoder (VAE) can be used where the g is the encoder and a decoder is added to the architecture in FIG. 3 to determine the likelihood of training labels. Alternatively, in the case where the projection g is invertible (e.g., a normalizing flow) then no change necessarily needs to be made to the architecture in FIG. 3; however, the likelihood can be modified to consider the joint likelihood of both training inputs and responses. This second case is particularly advantageous because, in addition to the lack of change required of the architecture, the likelihood of the training inputs can be determined exactly when Pr(z) is chosen to be a simple distribution (e.g., an isotropic Gaussian), as was discussed previously for the case of unsupervised learning. This architectural choice is additionally advantageous since existing approaches generally only consider simple, non-scalable, or non-Bayesian approaches to the supervised learning component of the formulation.

To perform inference for a semi-supervised learning problem, at block 402, the training dataset can include training inputs, $\{x^{(i)}\}^{n_{data}}_{i=1}$, in addition to responses associated with some of the inputs, i.e. $\{y^{(i)}\}_{i \in \{1, \ldots, n_{data}\}}$. In cases where g is invertible, performing inference for semi-supervised learning combines the learning approach for unsupervised learning (described herein) along with the supervised learning approach (described herein). Particularly, the likelihood used for semi-supervised learning can be the joint likelihood of training inputs (which is used in isolation for unsupervised learning), and available responses (which is used in isolation for supervised learning). Specifically, it can be assumed that the joint likelihood is the product of the likelihood over training inputs and responses. Using this updated likelihood, the inference approach follows the approach described herein with respect to inference for supervised learning; however, in the case of semi-supervised learning, the joint likelihood for dataset inputs and responses is used. This difference is reflected in the objective in 412.

The system 100 can be used to exploit the statistically rigorous modelling approach employed for training to provide accurate and robust analytics and decisions in the presence of uncertainty. The system 100 performs computation of analytics for decision making under uncertainty by evaluating a target function, evaluating high-dimensional integrals, and searching (or optimizing) in a high-dimensional space. In these tasks, the system 100 can intrusively exploit the architecture 306 to substantially reduce computational demands.

Figure 5:
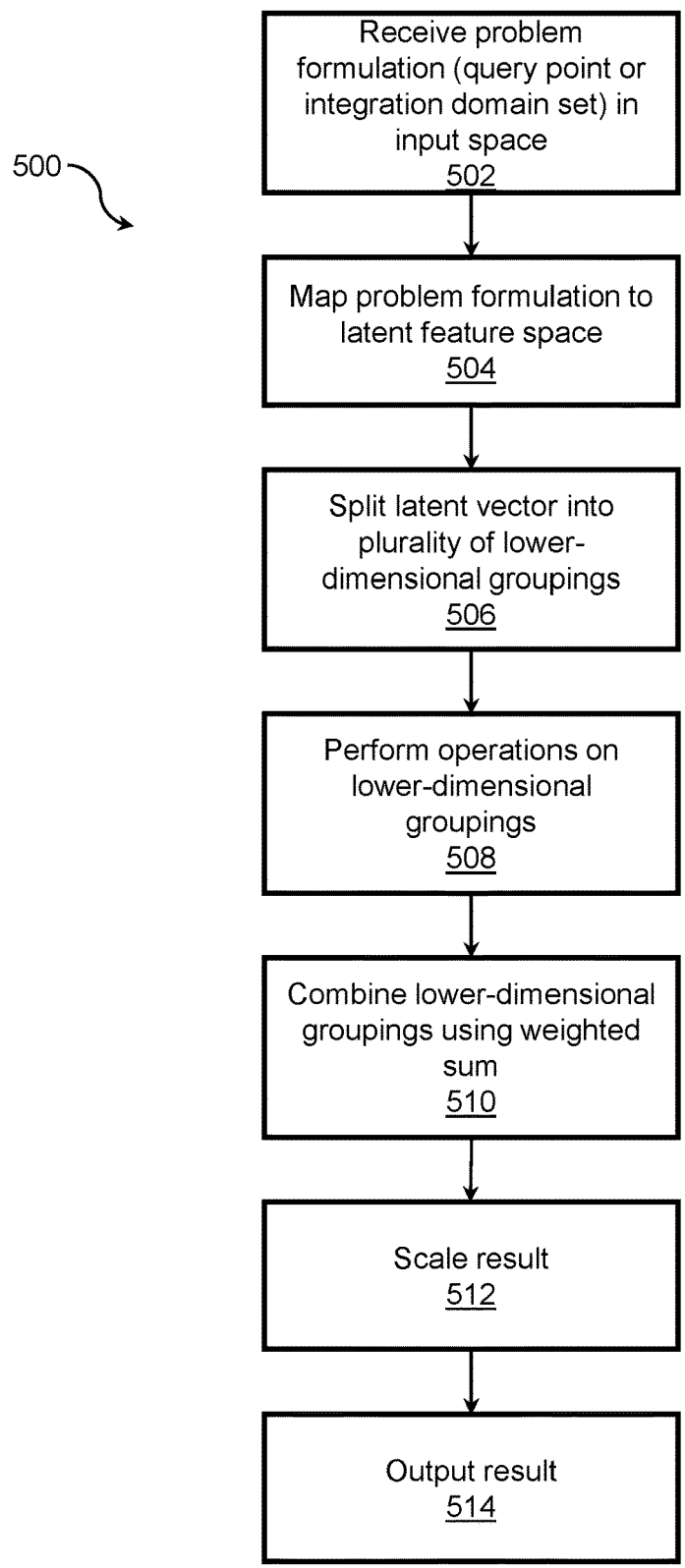
FIG. 5 is a flow chart of a method for performing operations on multi-dimensional functions, in accordance with an embodiment.
Figure 6:
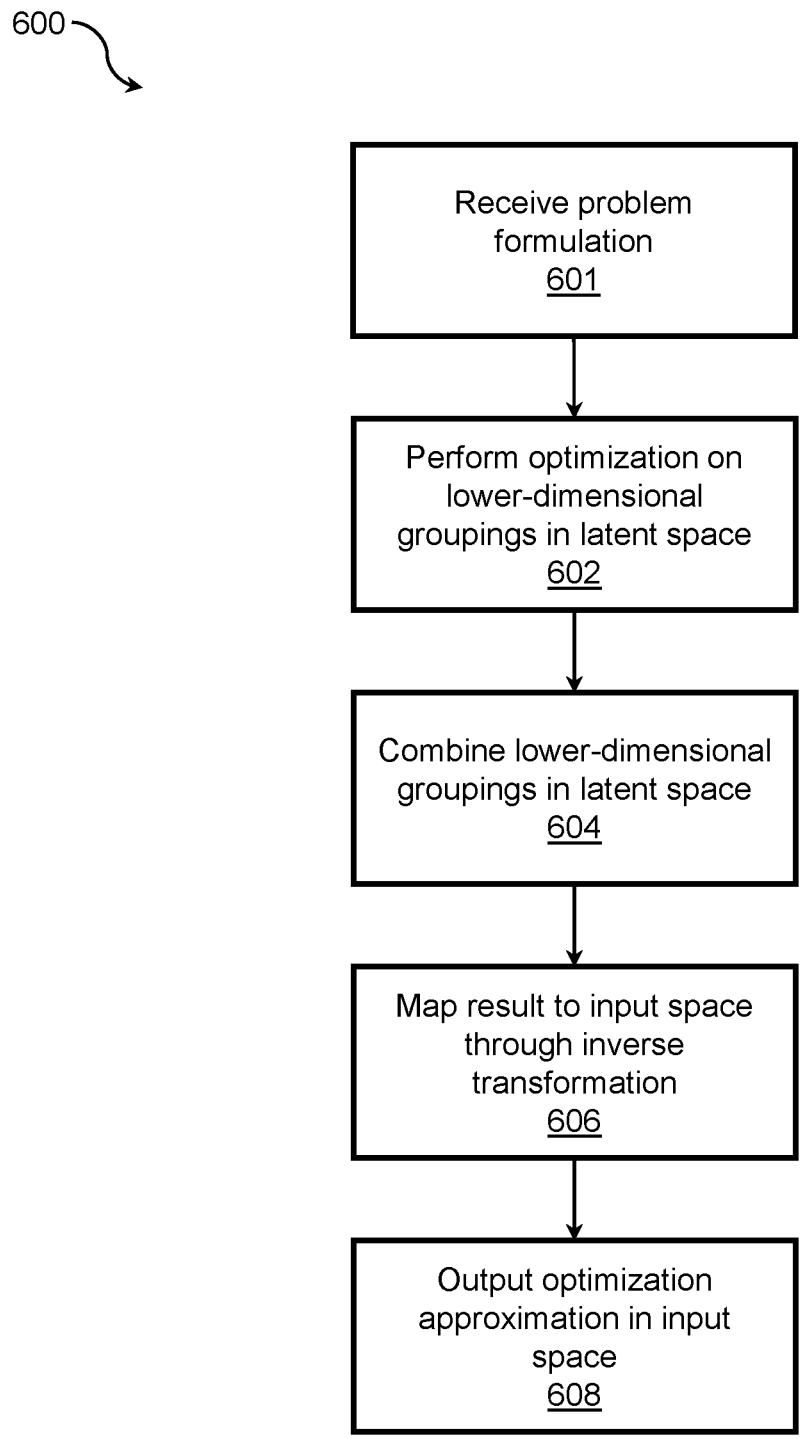
FIG. 6 is a flow chart of a method for performing operations on multi-dimensional functions, in accordance with another embodiment.

FIG. 5 and FIG. 6 illustrate methods for performing operations on multi-dimensional functions. These include the fundamental operations of function evaluation, integration, and optimization.

The system 100 can be used for function evaluation to predict targets or responses at any input point x.

Consider the approximation of an unknown exact function that generated the data $f_x(x)$ with the approximation $\hat{f}_x(x)$, used in the system 100. Note that without loss of generality, for the purposes of presentation, it can be assumed that $n_{out}=1$. The predictive posterior distribution over $\hat{f}_x$ can be easily and rapidly determined since it is a (potentially warped) sum of independent low-dimensional predictive models, for example Gaussian processes. Referring to FIG. 3, function evaluation can be performed at a query point, by passing this point into the projection g in 304, splitting the latent feature vector by the split operator 308, evaluating each of the independent GPs in 310, and recombining them through the affine transformation 312 to achieve the predictive posterior distribution.

FIG. 5 illustrates a flowchart for a method 500 for performing operations on multi-dimensional functions that can be practiced for function evaluation.

At block 502, the input module 122 receives the input query point. At block 504, the conversion module 124 maps the input query point to a latent vector in latent feature space using the projection 304.

At block 506, the conversion module 124 splits the latent vector into a plurality of lower-dimensional groupings of latent features using the split operator 308. At block 508, the operations module 126 performs certain operations on each of the lower-dimensional groupings of latent variables. For function evaluation, the operations involve computation of the posterior of each GP in 310, which can be performed independently on each Gaussian process.

At block 510, the output module 128 combines each of the low-dimensional groupings using a weighted sum or application of a linear transformation; for example, an affine transformation. The affine transformation is described in greater detail herein, for example, as multiplication with the matrix A. While the present disclosure generally describes an affine transformation, it is generally understood that any suitable linear transformation can be used. Note that generally, the predictive posterior will be a weighted sum or linear transformation of independent random variables. In the case of low-dimensional GPs 310, the predictive posterior will also be a Gaussian random variable whose statistics can be computed using various suitable techniques.

At block 514, the output module 128 outputs the results of the combination after the affine transformation in output space.

In particular applications, the system 100 can be used for more efficiently permitting integration of an underlying function that generated a data set, particularly where the function operates upon high-dimensional data. The system permits integration of a high-dimensional function (which persons of skill will appreciate can be intractable where the quantity of variables (the dimensionality) is sufficiently large). By mapping the variables to a new space, and then splitting the problem into a set of low-dimensional subproblems, the computational cost of solving the problem can be greatly reduced. The solution to the subproblems can then be combined and mapped back to the input space to provide the integration or approximate integration (with relatively small loss of information) of the unknown function.

Consider the approximation of the integral $\int_U f_x(x)dx$ using the approximation $\hat{f}_x(x)$, used in the system 100 to give $\int_U \hat{f}_x(x)dx$, where $U \subseteq \mathbb{R}^{n_{in}}$ is an open set in input space specifying a domain of integration, and $f_x(x)$ is the unknown exact underlying function that generated the training data. An integration problem formulation can involve specification of a set in input space U specifying a domain of integration at block 502. Note that without loss of generality, for the purposes of presentation, it can be assumed that $n_{out}=1$. The integral over the input space can be re-written as an integral over the latent space using integration by substitution. This change of variables is performed in block 504 where the set in input space specifying a domain of integration is passed through the projection g in 304 to give a set in latent space specifying a domain of integration. In this case, it is assumed that the projection 304 is invertible and that the Jacobian determinant of the projection 304 does not depend on a point in input space at which the projection is evaluated. In an example, these assumptions can be satisfied if the projection 304 is composed of invertible volume-preserving or linear functions. After the split operation by the split operator 308 of latent space into lower-dimensional groupings in 506, integration is performed (typically numerically, however in some cases, analytically) on each of the $n_{GP}$ low-dimensional GP models 310 independently in 508. Considering the ith low-dimensional grouping, the low-dimensional integral at 508 will be of dimension $|s_i|$. Specifically, this integral can be written as $$\int_{g(U)_{s_i}} \hat{f}_{z,i}(z_{s_i})dz_{s_i}.$$

Additionally, at block 508, for the ith low-dimensional grouping, an integral of dimension $n_{in}-|s_i|$ may also be required; however, this integral can be of a constant function whose value everywhere is unity, and therefore can be efficiently computed to high accuracy. Specifically, this integral can be written as $$\int_{g(U)_{s_i^c}} 1 \, dz_{s_i^c},$$

where $s_i^c$ is a set of indices containing the elements not in the set $s_i$ (i.e. the set complement). The outputs of the integration at 508 would be the product of these two integrals for each low-dimensional grouping. The computations for each low-dimensional grouping are combined using the affine transformation 312 at block 510. In some cases, as an artefact of integration by substitution, the resultant combination can be multiplied by a positive scalar that is the absolute value of the determinant of the Jacobian of the inverse projection $g^{-1}$, 304. This scaling takes into account the change in volume from the projection 304. This can be accomplished at block 512. The result can be output at block 514.

To accommodate other applications, the system 100 can be used for efficiently permitting optimization of an underlying function that generated a data set, particularly where the function operates upon high-dimensional data. Consider the optimization problem $\mathrm{argmin}_{x \in R^{n_{in}}} f_x(x) \approx \mathrm{argmin}_{x \in R^{n_{in}}} \hat{f}_x(x)$, where $f_x$ is an unknown exact underlying function that generated the data, and the approximation $\hat{f}_x$ used in the system 100 can be used to approximate the solution of this optimization problem. Note that without loss of generality, for the purposes of presentation, it can be assumed that $n_{out}=1$. The optimization problem specified in the preceding equation can also be supplemented with specification of input bounds (such that a solution is required to be determined in a pre-defined region of input space), as well as specification of equality or inequality constraints that must be satisfied at a solution. These cases are described herein, however, for the purposes of illustration, the case with no bounds or constraints is described below.

The present embodiments allow decomposition of the above optimization problem to a plurality of lower-dimensional optimization problems. Advantageously, the present embodiments do not have to assume the problem is of a lower dimensionality; other approaches often take a loss of information by assuming the problem is of a lower dimensionality. In contrast, the mapping of the present embodiments is invertible, or approximately invertible, so there is no, or almost no, loss of information, respectively.

FIG. 6 illustrates a method of optimization 600, in accordance with the present embodiments. At block 601, the input module 122 can begin optimization by receiving a problem formulation. The problem formulation can be, for example, a definition of which outputs from block 514 (or a combination thereof) are to be maximized or minimized (for the purposes of illustration, the case of minimization of a single output will be discussed). The problem formulation 601 may include one or more input vectors to be used for initialization of optimization. Optimization performed by the system 100 includes optimizing an acquisition function of each of the low-dimensional GPs 310 individually at block 602 where the acquisition function of each low-dimensional GP is scaled by its respective affine transformation parameter $a_i$ ($a_i$ being the ith element in A, which is a vector in the case of $n_{out}=1$ currently used for the purposes of illustration). After obtaining an argument of a minima of each low-dimensional GP acquisition function, at block 604 the arguments can be combined to give the argument of the minima as one or more vectors in latent space using the inverse of the split operation performed by the split operator 308, split$^{-1}$. Note that it is assumed here that the split operation is invertible. In an example, the split operator 308 will be invertible when the subsets $s_i$ have no overlap (i.e., no index appears in multiple $s_i$ sets for all $$i = 1, \ldots, n_{GP}), \text{ and } \sum_{i=1}^{n_{GP}} |s_i| = n_{latent}.$$

The one or more latent vectors in latent space that comprise the output of the combination at block 604 can then be passed through the inverse of the projection 304 ($g^{-1}$) at block 606 (where it is assumed that the projection operation 304 is invertible) to give the argument of the minima as one or more vectors in input space. The result can then be output at block 608.

In a particular case where the split operator 308 is not invertible, or where the optimization formulation 601 does not admit a decoupled optimization formulation on each low-dimensional grouping in latent space, the optimization performed on lower-dimensional groupings in latent space 602 can be performed on each lower-dimensional grouping sequentially. In this manner, only the dimensions in each low-dimensional group are optimized at any given time while all other dimensions are fixed. The optimization of each low-dimensional group can be performed multiple times by sequentially iterating through each low-dimensional group in deterministic or stochastic order until a termination criterion is met. In an example, termination could occur when a maximum iteration count is exceeded. Upon termination of the optimizations in 602, the optimization problem solution is already represented as one or more latent vectors in latent space, and therefore no operation needs to be performed to combine the lower-dimensional groupings at 604. The one or more latent vectors in latent space composing the optimization problem solution can then be passed through the inverse of the projection 304 ($g^{-1}$) at block 606 to give the optimization problem solution as one or more vectors in input space. The result can then be output at block 608.

The problem formulation 601 may also include specification of input bounds. In this case, the feasible domain can be transformed from input space to latent space before the optimization is performed in latent space at block 602. In a particular case where the projection operation 304 is linear, these input bounds can be satisfied by specifying a linear inequality constraint in latent space that can be taken into account when the optimization process is performed in latent space in block 602.

The problem formulation 601 may also include specification of equality or inequality constraints, whose constraint functions may or may not be outputs from 514. In a particular case where the projection operation 304 is linear, and some equality or inequality constraints are linear, these constraints can be satisfied by specifying a linear equality or inequality constraint in latent space, respectively, that can be taken into account when the optimization process is performed in latent space in block 602. In a particular case where some constraint functions are outputs from block 514, the constraint problem can be transformed from input space to latent space in the same manner as the maximization/minimization problem described herein through the use of the projection 304. After this projection to latent space, the constrained optimization can be performed in latent space at block 602.

Advantageously, the present embodiments do not have to assume the problem is of a lower dimensionality; other approaches often take a loss of information by assuming the problem is of a lower dimensionality. In contrast, the mapping of the present embodiments is invertible, or approximately invertible, so there is no, or almost no, loss of information, respectively.

The present embodiments can be used for any number of suitable applications. In an example, the present embodiments can be used for multidisciplinary design optimization. In this scenario, system 100 models outputs from multiple simulation models representing various disciplines and it is sought to maximize and/or minimize an appropriate measure of system level performance subject to a set of constraints.

In another example, the present embodiments can be used for robust design (otherwise referred to as optimization under uncertainty). This is a variant of a standard design/decision optimization problem where a set of control variables have been identified (i.e. variables that are within the control of the practitioner) along with noise variables (i.e. variables that are inherently uncertain or expensive to control precisely but their statistics/bounds are available). The present embodiments can be used to optimize performance measures reflecting the robustness of the design/decision, subject to a set of deterministic/probabilistic constraints.

In another example, the present embodiments can be used for direct and inverse uncertainty analysis. In direct uncertainty analysis, the practitioner is concerned with predicting the statistics of the outputs of a computer model as a function of uncertainty in its inputs. The statistics of interest may include the first-order and second-order statistical moments and probability distributions of the outputs, output bounds, and the probability of occurrence of a critical value/failure. These statistical predictions may be used to evaluate the robustness of a given design/decision or to compare the robustness of a set of competing design/decision alternatives in the presence of uncertainty. In inverse uncertainty analysis, the practitioner seeks the optimum (e.g. manufacturing) tolerances for a particular design/decision given statistics/bounds for acceptable performance levels.

In another example, the present embodiments can be used for predictive capability diagnostics. Diagnostic analytics and visualizations can provide detailed insights into a dataset, or into the predictive capabilities of the system 100 for a given application.

In another example, the present embodiments can be used for visualization tools. Visualization of high dimensional datasets and predictive models can provide useful insights into a problem or decision-making process. Due to the Bayesian framework employed by the system 100, accurate and calibrated "error bars" are available. Additionally, the natural feature extraction capabilities of the system 100 can assist in reducing dimensionality of visualizations.

In another example, the present embodiments can be used for Bayesian model calibration. In this scenario, the free parameters of a third-party predictive model can be fitted to observational data. This fitting or calibration process can be accomplished using Bayesian statistics to infer a posterior distribution over the free parameter values.

In another example, the present embodiments can be used for autonomous decision making and Markov decision processes. In this scenario, the control of an agent is being performed in an automated manner. In order for the agent to perform safely and robustly in a real world scenario, it is crucial to be able to accurately quantify the uncertainty of decisions.

In another example, the present embodiments can be used for active learning or sequential design of experiments. In this scenario, data collection is being performed sequentially to achieve some goal such as improving the quality using as few data-points as possible. Often, the true underlying function can be queried upon request, however, the evaluation process may be expensive.

In another example, the present embodiments can be used for high-dimensional integration. High-dimensional numerical integration of functions that are expensive to evaluate is a challenging problem. The system 100 excels at computation of high-dimensional integrals, and this can be directly applied to real-world problems. For example, such problems arise frequently in financial modelling.

In another example, the present embodiments can be used for anomaly detection or novelty detection. Detecting out-of-distribution samples can be used to identify anomalies or novel behaviour. This can be used to detect, for example, fraud, detect erroneous or unexpected behaviour, and to identify promising directions for discovery.

In another example, the present embodiments can be used for modelling and solving ordinary differential equations (ODE) and partial differential equations (PDE). Predictive machine learning models can be used to efficiently assist solving expensive ordinary and partial differential equations. Additionally, when modelling ODEs or PDEs, the Bayesian capabilities of the system 100 admit stochastic equations that can be integrated in time to allow propagation of uncertainty for forecasting applications.

The present embodiments can be used for other examples and applications as appropriate.

Although the invention has been described with reference to certain specific embodiments, various modifications thereof will be apparent to those skilled in the art without departing from the spirit and scope of the invention as outlined in the claims appended hereto.

The invention claimed is:

1. A computer-implemented method for performing operations on multi-dimensional functions using a machine learning model, the method comprising:
   receiving a problem formulation in input space;
   mapping the problem formulation from input space to one or more latent vectors or a set in latent feature space using a projection learned using the machine learning model;
   splitting the one or more latent vectors or set in latent space into a plurality of lower-dimensional groupings of latent features;
   performing one or more operations in latent space on each lower-dimensional groupings of latent features;
   combining each of the low-dimensional groupings; and
   outputting the combination for generating the prediction.

2. The method of claim 1, wherein combining each of the low-dimensional groupings comprises applying a learned affine transformation.

3. The method of claim 1, wherein the problem formulation comprises a set in input space specifying a domain of integration, and wherein the one or more operations comprise evaluating lower-dimensional integrals comprising the lower-dimensional groupings.

4. The method of claim 1, wherein the problem formulation comprises an input query point, and wherein the one or more operations comprise evaluating lower-dimensional functions with the input query point.

5. The method of claim 1, wherein the lower-dimensional groupings comprise one-dimensional groupings.

6. The method of claim 1, wherein the learned projection comprises a hierarchy of components, at least a portion of the hierarchy of components are invertible.

7. The method of claim 6, wherein at least a portion of the hierarchy of components comprise invertible linear functions or invertible non-linear dimension-wise functions.

8. The method of claim 1, wherein the machine learning model comprises a Bayesian or frequentist deep neural network or linear regression model.

9. The method of claim 1, wherein performing the one or more operations in latent space comprise performing operations on Gaussian processes.

10. The method of claim 9, wherein the Gaussian processes comprise additive Gaussian processes.

11. The method of claim 9, wherein parameters for the Gaussian processes are determined by optimization of an objective, the objective comprising one of maximum likelihood estimation, data log likelihood, log of the product of data likelihood, and evidence lower bound.

12. A system for performing operations on multi-dimensional functions using a machine learning model, the system comprising one or more processors in communication with a data storage, the one or more processors configured to execute:
   an input module to receive a problem formulation in input space;
   a conversion module to map the problem formulation from input space to one or more latent vectors or a set in latent feature space using a projection learned using the machine learning model, and to split the one or more latent vectors or set in latent space into a plurality of lower-dimensional groupings of latent features;
   an operations module to perform one or more operations in latent space on each lower-dimensional groupings of latent features; and
   an output module to combine each of the low-dimensional groupings and to output the combination for generating the prediction.

13. The system of claim 12, wherein combining each of the low-dimensional groupings comprises applying a learned affine transformation.

14. The system of claim 12, wherein the problem formulation comprises a set in input space specifying a domain of integration, and wherein the one or more operations comprise evaluating lower-dimensional integrals comprising the lower-dimensional groupings.

15. The system of claim 12, wherein the problem formulation comprises an input query point, and wherein the one or more operations comprise evaluating lower-dimensional functions with the input query point.

16. The system of claim 12, wherein the learned projection comprises a hierarchy of components, at least a portion of the hierarchy of components are invertible.

17. The system of claim 12, wherein the machine learning model comprises a Bayesian or frequentist deep neural network or linear regression model.

18. The system of claim 12, wherein performing the one or more operations in latent space comprise performing operations on Gaussian processes.

19. The system of claim 18, wherein the Gaussian processes comprise additive Gaussian processes.

20. The system of claim 18, wherein parameters for the Gaussian processes are determined by optimization of an objective, the objective comprising one of maximum likelihood estimation, data log likelihood, log of the product of data likelihood, and evidence lower bound.

\* \* \* \* \*